United States Patent
Petersen et al.

(10) Patent No.: US 8,225,326 B2
(45) Date of Patent: Jul. 17, 2012

(54) FUTURE SCHEDULING BY DIRECT REPRESENTATION OF POSSIBLE DEPENDENCIES

(75) Inventors: Leaf Petersen, Seattle, WA (US); Anwar Ghuloum, Menlo Park, CA (US); Mohan Rajagopalan, Mountain View, CA (US)

(73) Assignee: Intel Corporation, Santa Clara, CA (US)

( * ) Notice: Subject to any disclaimer, the term of this patent is extended or adjusted under 35 U.S.C. 154(b) by 1103 days.

(21) Appl. No.: 12/049,914

(22) Filed: Mar. 17, 2008

(65) Prior Publication Data

US 2009/0235273 A1    Sep. 17, 2009

(51) Int. Cl.
G06F 9/46    (2006.01)
G06F 9/52    (2006.01)

(52) U.S. Cl. ......... 718/106; 718/102; 718/104; 718/105

(58) Field of Classification Search ................... 718/104, 718/105, 102, 106
See application file for complete search history.

(56) References Cited

U.S. PATENT DOCUMENTS

| | | | | |
|---|---|---|---|---|
| 5,390,193 A * | 2/1995 | Millman et al. | ............... | 714/741 |
| 5,832,484 A * | 11/1998 | Sankaran et al. | ............ | 1/1 |
| 5,988,854 A * | 11/1999 | Munakata | ............ | 700/95 |
| 6,219,834 B1 * | 4/2001 | Soroker et al. | ............ | 717/145 |
| 6,324,639 B1 * | 11/2001 | Heishi et al. | ............ | 712/212 |
| 6,550,059 B1 * | 4/2003 | Choe et al. | ............ | 717/159 |
| 6,611,956 B1 * | 8/2003 | Ogawa et al. | ............ | 717/152 |
| 6,817,013 B2 * | 11/2004 | Tabata et al. | ............ | 717/151 |
| 7,103,597 B2 * | 9/2006 | McGoveran | ............ | 1/1 |
| 7,594,227 B2 * | 9/2009 | Inchingolo et al. | ............ | 718/100 |
| 7,657,769 B2 * | 2/2010 | Marcy et al. | ............ | 713/375 |
| RE41,751 E * | 9/2010 | Heishi et al. | ............ | 712/210 |
| 2004/0268335 A1 * | 12/2004 | Martin et al. | ............ | 717/161 |
| 2005/0071438 A1 * | 3/2005 | Liao et al. | ............ | 709/214 |
| 2007/0067201 A1 * | 3/2007 | Malewicz | ............ | 705/9 |
| 2009/0002379 A1 * | 1/2009 | Baeza et al. | ............ | 345/522 |

OTHER PUBLICATIONS

Wanger et al., "Leapfrogging: A portable technique for implementing efficient futures". In Proceedings of the 4th ACM SIGPLAN Symposium on Principles and Practices of Parallel Programming, San Diego, CA, 1993.

* cited by examiner

*Primary Examiner* — Aimee Li
(74) *Attorney, Agent, or Firm* — Hanley, Flight & Zimmerman, LLC

(57) ABSTRACT

A method for evaluating objects in a data structure is provided. The method includes assigning one or more objects to one or more nodes in a data structure having at least a root node, in which the objects are assigned to the nodes in accordance with a first order to maintain pre-existing dependencies between the objects and to allow the objects to be evaluated in a serial manner to avoid deadlock when concurrently executing threads to evaluate the objects, and selecting a first object for evaluation, in response to determining that the current object is unevaluated.

25 Claims, 5 Drawing Sheets

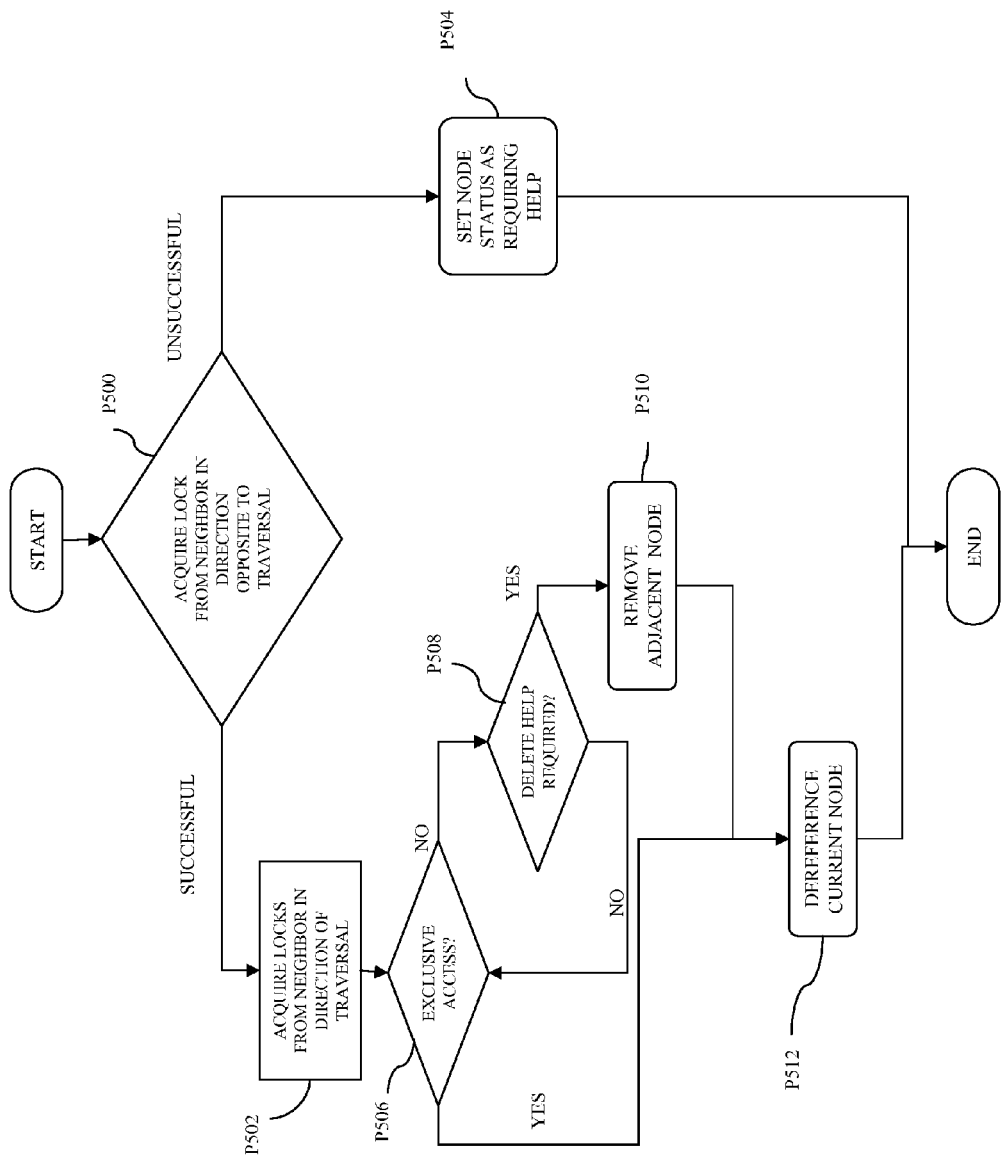

FUTURE SCHEDULING BY DIRECT REPRESENTATION OF POSSIBLE DEPENDENCIES

COPYRIGHT & TRADEMARK NOTICES

A portion of the disclosure of this patent document contains material, which is subject to copyright protection. The owner has no objection to the facsimile reproduction by any one of the patent document or the patent disclosure, as it appears in the Patent and Trademark Office patent file or records, but otherwise reserves all copyrights whatsoever.

Certain marks referenced herein may be common law or registered trademarks of third parties affiliated or unaffiliated with the applicant or the assignee. Use of these marks is for providing an enabling disclosure by way of example and shall not be construed to limit the scope of this invention to material associated with such marks.

TECHNICAL FIELD

The present disclosure relates generally to concurrent computing and scheduling computational tasks, and more particularly to methods for scheduling computations and direct representation of future dependencies without deadlock.

BACKGROUND

Concurrent computing involves the simultaneous execution of multiple computational tasks. These tasks may be implemented as separate programs, processes, or threads executable on a single processor or several processors. Dependencies between tasks (e.g., reliance of one task on a value calculated by another task) can prevent or delay successful concurrent processing of computational tasks. Therefore, key concerns when designing concurrent computing systems include optimal sequencing of the different tasks and coordinating access to resources that are shared between those tasks.

A common method used to synchronize and coordinate between tasks involves direct representation of possible dependencies through variables implemented as programming constructs such as a future or promise. A future serves as a proxy for a computed value which may be needed at some point in the subsequent execution of a program, process, or thread. Futures can be scheduled for computation without a need to dynamically create additional concurrent resources. A common approach to scheduling futures involves placing unevaluated futures in a global or distributed task queue upon creation. A thread then can remove, update and evaluate the futures in the queue, according to the computed value and schedule when deemed proper.

During computation, a thread may attempt to read from a future which is under evaluation concurrently by another thread. If this happens, the thread must stall and wait for the other thread to return a result before it can continue. If enough number of threads are blocked or stalled, there will be no additional threads available to keep the processor busy. Accordingly, systems and methods are desired that can allow a blocked or stalled thread to continue productive work even when blocked from reading a future.

BRIEF DESCRIPTION OF THE DRAWINGS

Embodiments of the present invention are understood by referring to the figures in the attached drawings, as provided below.

FIG. 5 is a flow diagram of an exemplary locking algorithm for removal of nodes from the data structure of FIG. 3 in accordance with one embodiment.

Features, elements, and aspects of the invention that are referenced by the same numerals in different figures represent the same, equivalent, or similar features, elements, or aspects, in accordance with one or more embodiments.

DETAILED DESCRIPTION OF EXAMPLE EMBODIMENTS

The present invention is directed to methods and systems for scheduling futures in concurrent computing systems.

For purposes of summarizing, certain aspects, advantages, and novel features of the invention have been described herein. It is to be understood that not all such advantages may be achieved in accordance with any one particular embodiment of the invention. Thus, the invention may be embodied or carried out in a manner that achieves or optimizes one advantage or group of advantages without achieving all advantages as may be taught or suggested herein.

A method for evaluating objects in a data structure is provided. The method comprises assigning one or more objects to one or more nodes in a data structure having at least a root node, wherein the objects are assigned to the nodes in accordance with a first order to maintain pre-existing dependencies between said objects and to allow the objects to be evaluated in a serial manner to avoid deadlock when several threads are concurrently executing to evaluate the objects; and selecting a first object for evaluation, in response to determining that the current object is unevaluated.

The method may further comprise traversing the data structure in accordance with the first order for a second object to be evaluated, in response to determining that the first object is unavailable. In one embodiment, each object in the data structure represents a future created according to a spawning computation which provides an executing thread with a code pointer and an argument from which the result of the future can be computed.

In accordance with another embodiment, a system comprising one or more logic units is provided. The one or more logic units are configured to perform the functions and operations associated with the above-disclosed methods. In accordance with yet another embodiment, a computer program product comprising a computer useable medium having a computer readable program is provided. The computer readable program when executed on a computer causes the computer to perform the functions and operations associated with the above-disclosed methods.

One or more of the above-disclosed embodiments in addition to certain alternatives are provided in further detail below with reference to the attached figures. The invention is not, however, limited to any particular embodiment disclosed.

Figure 1:
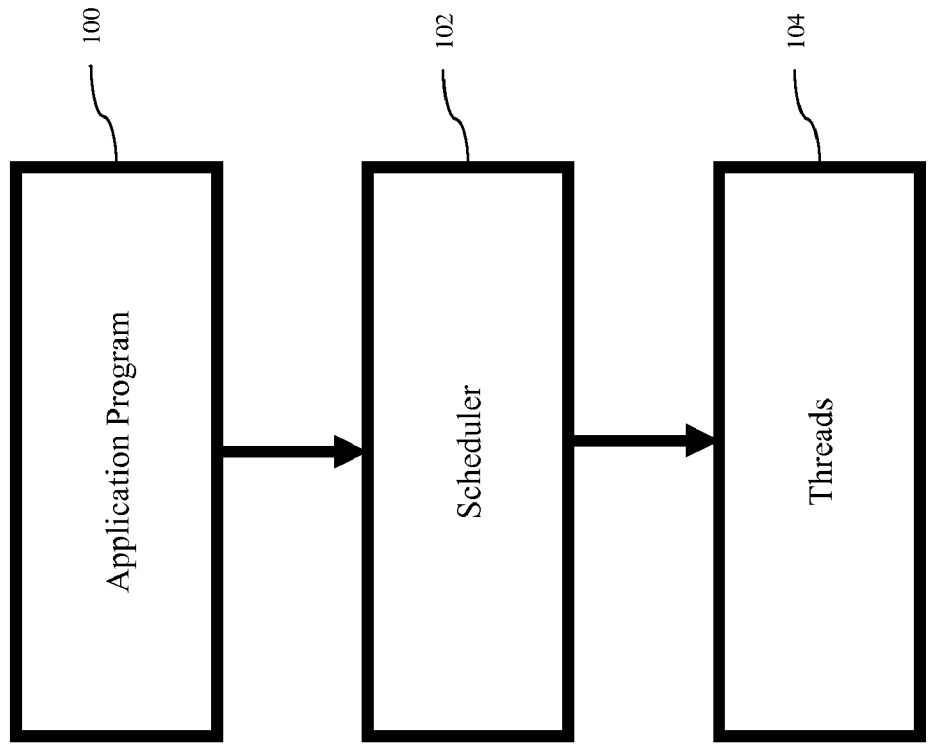
FIG. 1 is a block diagram of an exemplary operating environment in accordance with one embodiment.

Referring to FIG. 1, a flow diagram of an exemplary operating environment in accordance with one embodiment is shown. An application program 100 generates or instantiates objects or work items, such as futures, when the program 100 is compiled and executed. The work items are then passed to a scheduler 102 which may comprise one or more logic units.

The scheduler 102 may arrange the work items for concurrent execution. The scheduler 102 multiplexes work items and provides them to one or more threads 104. A threading package may be used to provide threading functionality and enable multithreaded execution. It is noteworthy that the systems and methods discussed herein are not limited to any particular threading standard.

In one embodiment, scheduler 102 may arrange the work items generated by one or more application programs 100 in a way that avoids introducing deadlock during concurrent execution. For the purposes of illustration, in the following, futures are discussed as work items generated by application program 100. It is noteworthy, however, that the systems and methods discussed herein are not to be construed as limited to futures and may be modified to accommodate other methods of direct representation.

A future serves as a proxy for a computed value which may be needed at some point in the subsequent execution of a program. A future is created by a spawning computation which provides the runtime system with a code pointer and an argument from which the result of the future can be computed. The actual computation of the value may be done either at the point of the original spawn, at the point when the value is needed, or at any point in between. In some embodiments, a program using futures may be executed as a serial program by evaluating the computed value of the future upon creation. Desirably, a futures-based program may be executed as a serial program.

In accordance with one embodiment, a future may be in one of three possible states: unevaluated, evaluated or busy. A future in the unevaluated state returns a pointer and an argument from which to compute a result. A future in the evaluated state returns a value which may be read directly. A future in the busy state is deemed to be dependent on calculation of another value, or under evaluation by another thread or process and may not be read until the evaluation is complete.

Figure 2:
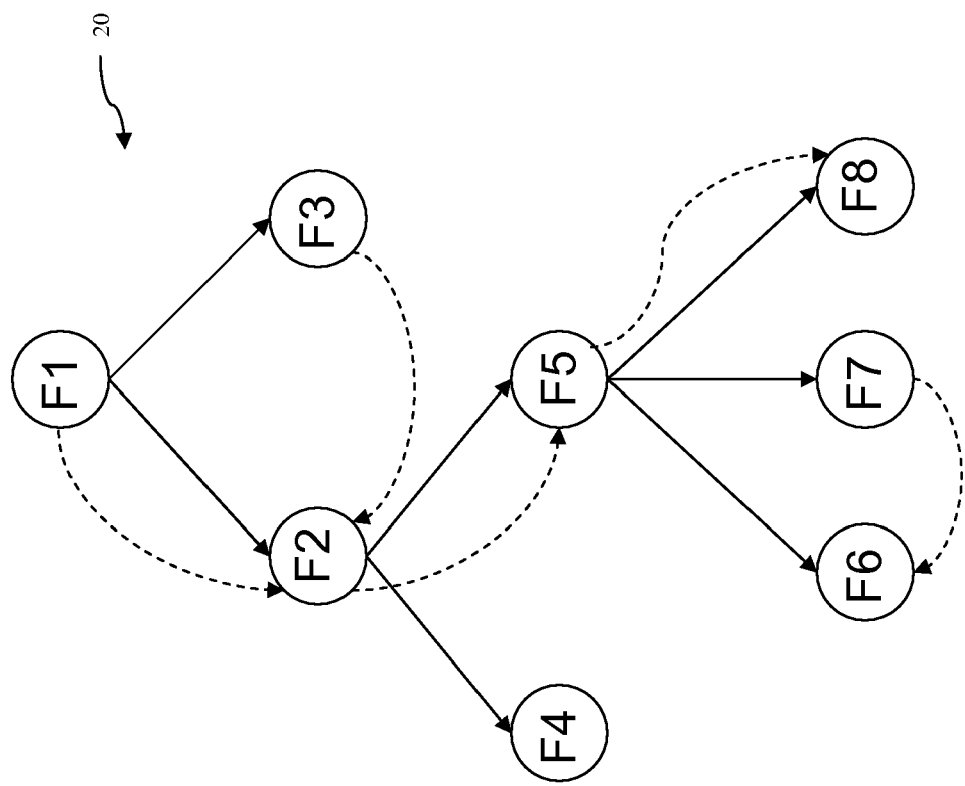
FIG. 2 is a block diagram of an exemplary dependency graph in accordance with one embodiment.

Referring to FIG. 2, a block diagram of an example dependency graph, in accordance with one embodiment, is shown. The nodes in the dependency graph represent futures. A solid edge indicates a spawn and a broken edge indicates a read. For example, future F1 spawns futures F2 and F3, and reads from future F2. The term spawn as used herein refers to the creation or instantiation of an object represented as a future, as provided above.

In accordance with one embodiment, unevaluated futures may be placed in a task queue upon creation. Desirably, a thread (also referred to as a worker thread) removes a future from this queue, evaluates the future, and updates the future with a computed value. If a thread attempts to read from a future which is being evaluated concurrently, it may wait for the result to be returned before it can continue.

The dependency graph 20 in FIG. 2 shows that a scheduler may not choose an arbitrary future to execute on a worker thread's stack while waiting for a currently executing future that is blocked. For example, a first worker thread begins execution at F1 which spawned F2 and F3. In order to continue evaluation of F1, the first worker thread reads F2 and evaluates F2 on the worker thread's own stack, which introduced more spawns and reads during execution. For the example, the first worker thread may then attempts to read and evaluate F5 on its own stack, which introduced even further spawns and reads during execution. The first thread continues to obtain futures to evaluate by selecting F8.

Assume a second worker thread, operating concurrently with the first worker thread, begins by obtaining F3 from the scheduler. The second thread attempts to read from F2 when it attempts to evaluate F3. F2 is, however, under evaluation by the first thread and may not be read at this time. In order to avoid deadlock and continue useful operation, the second thread may choose F6 and begin evaluating F6. Suppose now that the second worker thread for some reason cannot evaluate F6 at this time. In order to avoid deadlock again, the second worker thread may obtain another future to evaluate.

In accordance with the exemplary embodiment in FIG. 2, other future options available to the second worker thread are, for example, two futures that have not been selected by the first thread: i.e., F4 and F7. F7 reads from F6. Thus, F7 may not be fully evaluated until evaluation of F6 is completed. Since F6 is already suspended on the second thread's stack, selecting F7 introduces a deadlock that was not present in the original program. In one embodiment, a worker thread may safely execute futures which are known not to depend on any future which the worker thread itself is in the process of computing.

Figure 3:
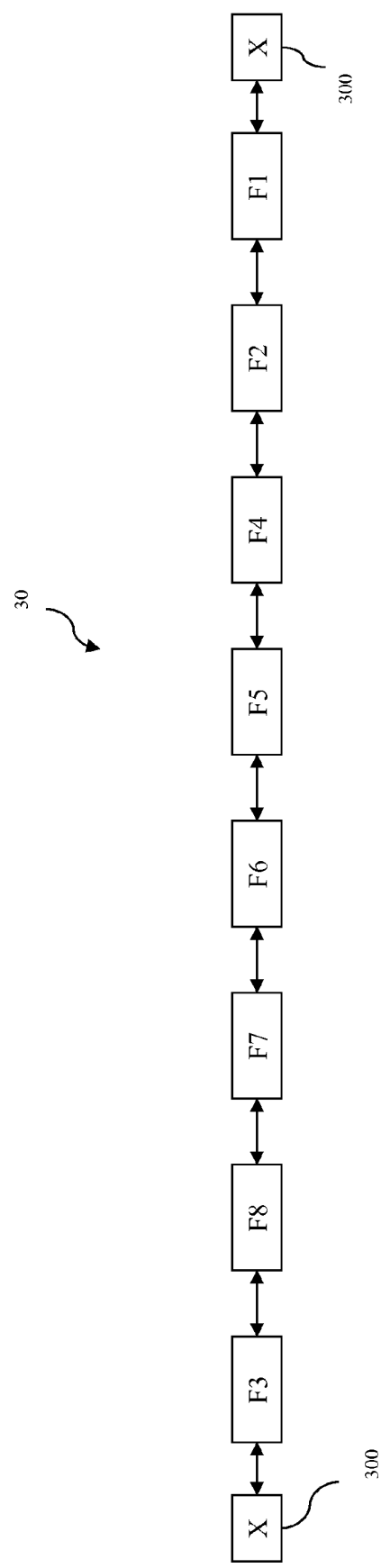
FIG. 3 is a block diagram of an exemplary scheduling data structure in accordance with one embodiment.

Referring to FIG. 3, a dependency graph 20 such as that illustrated in FIG. 2 may be represented in form of a data structure 30. In this exemplary embodiment, a doubly-linked list data structure is illustrated having sentinel nodes 300. By way of example, in the following, one or more embodiments are disclosed as applicable to a doubly-linked list data structure 30. It is noteworthy, however, that other types of data structure such as arrays, singularly linked lists, etc. may be utilized to achieve the same or similar purpose. As such, the methods and systems described herein are not limited to this exemplary data structure, and can be modified to accommodate alternative data structures.

In the noted exemplary embodiment, a doubly-linked list may be implemented to simplify the process of traversing, inserting, and removing nodes from the list. The nodes in data structure 30 may include futures that maintain pointers to neighboring nodes which may be used to support operations in as provided in more detail below.

In accordance with one embodiment, data structure 30 maintains the scheduling order of the unevaluated futures such that a future object to the left of a selected future object is independent of the selected future object. For example, F2 is independent of F1 as illustrated in FIGS. 2 and 3. It is noteworthy, that the right to left ordering shown and described herein is solely for the purposes of illustration. Thus, in alternative embodiments a different order (e.g., left to right, top down, etc.) may be implemented.

In a certain embodiment, the scheduling order may be maintained during the spawn or creation of a new future. A worker thread that spawns a new future allocates and initializes the future node with the appropriate pointer and argument and a status indicator to initialize the future in the unevaluated state. The worker thread then inserts the new future into a scheduling data structure (e.g., data structure 30) to the left of the current root node of the worker thread.

As shown in FIG. 3, for example, F1 spawns F2 and F3 which are created and inserted to the left of F1 in data structure 30. F2 then spawns F4 and F5, which are inserted to the left of F2 and to the right of F3. This creates and maintains the scheduling order defined above, where a future node to the left of a current future node is independent of the current future node because child nodes (containing futures spawned during evaluation of another future) are implemented not to depend on (i.e. attempt to read from) a parent node. Thus, the scheduling order implemented in the scheduling data structure maintains any dependencies in a serial ordering conducive to concurrent evaluation.

The scheduling data structure is thus implemented to maintain the scheduling order, and is accessible to the worker threads, so that a worker thread that is left without a task to perform can select a task (e.g., a future) from the scheduling data structure, according to the scheduling order, without risking the potential for a deadlock. In addition, a worker thread that is actively working on a future maintains in its thread local storage a pointer to the location (e.g., the root) in the listing of the future node currently being worked on.

Figure 4:
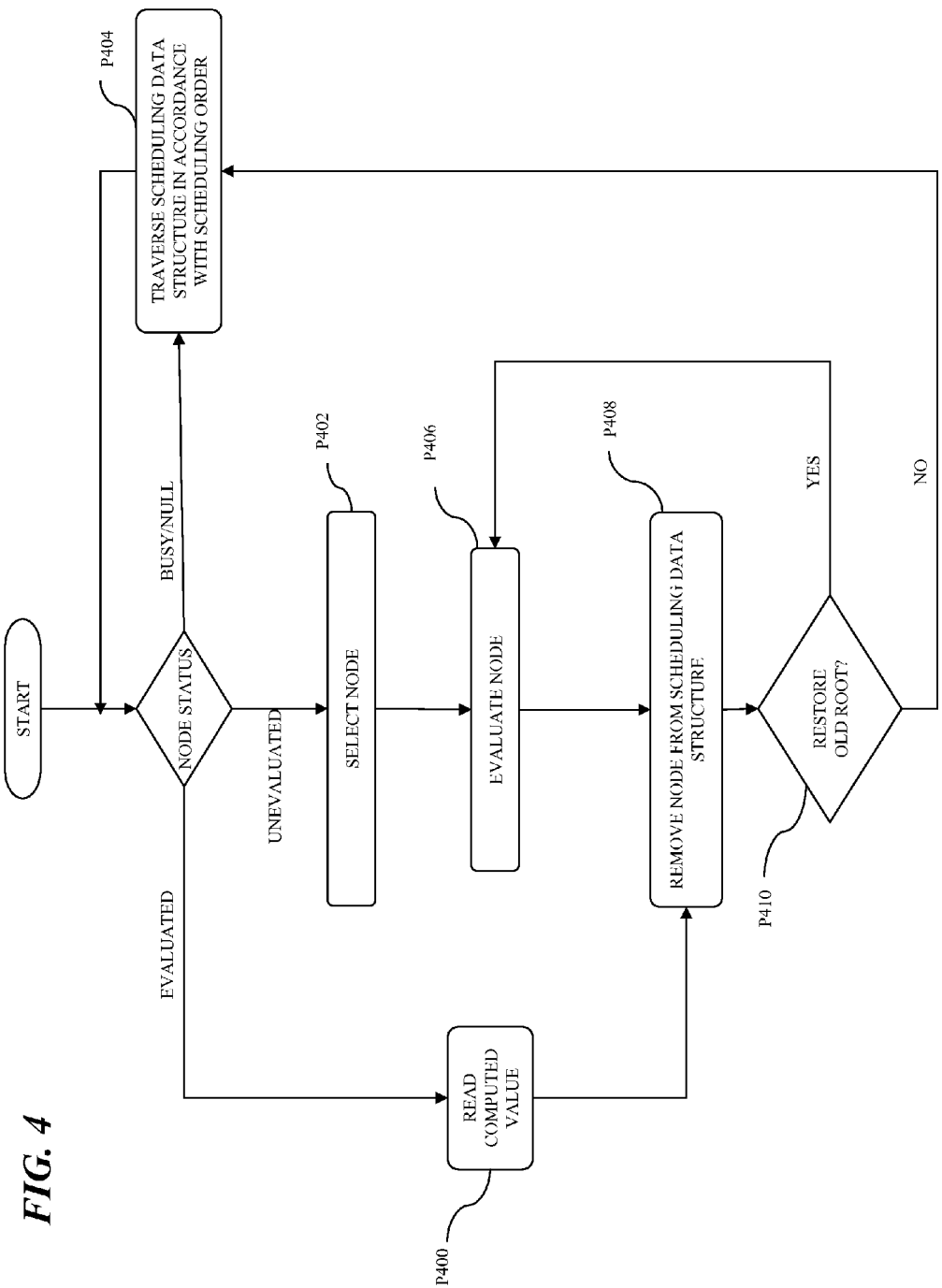
FIG. 4 is a flow diagram of an exemplary scheduling algorithm in accordance with one embodiment.

Referring to FIG. 4, a flow diagram illustrating an exemplary scheduling algorithm for use in evaluating objects in the scheduling data structure in accordance with one embodiment is illustrated. As shown, a worker thread which is not currently working on any active future or may not complete evaluating the current future finds work by traversing the scheduling data structure according to the scheduling order looking for an unevaluated node. A node in the scheduling data structure may be used as the starting point for traversal, and different scheduling policies may be implemented by appropriate choices of starting node. In one embodiment, a sentinel node 300 may be used as the default starting (i.e., current) node.

A worker thread may first attempt to read from the current node. If the current node status is in the evaluated state, the worker thread reads the computed value of the node (P400). The worker thread then removes the node from the scheduling data structure (P408). If the current node status is in the unevaluated state, the thread selects the unevaluated node (P402). In one embodiment, the thread updates the status of the selected unevaluated node to indicate the node is now busy. The selected node is marked as the current root node, and the thread desirably saves the original root node, if one is present.

In one embodiment, the thread proceeds with evaluating a selected node (e.g., the current root) (P406). The thread may evaluate the node by computing the desired result using the respective pointer and argument for the node's future. Once a future is evaluated, the node is removed from the scheduling data structure (P408). After a node is removed from the scheduling data structure, the worker thread restores the original root node, if present (P410), and iteratively retries to evaluate the original root node (P406).

If the current future node status is in the busy state (or if the current future node is a sentinel node 300 or null), the worker thread traverses the nodes in the scheduling data structure in accordance with the scheduling order (P404). If the current node status is in the busy state, some other thread may have already acquired exclusive access to the current node and the current thread may wait until the other thread completes execution of the future before the current thread can read from the node. In order to continue to do useful work, in one embodiment, the thread continues to traverse the scheduling data structure according to the scheduling order, starting at the current root, and attempting to acquire exclusive access to another future.

For example, referring to FIGS. 2 and 3, a first worker thread may begin from the right sentinel node 300 which returns a null value when read. The first worker thread may traverse data structure 30 in accordance with the scheduling order (e.g., right to left for the purpose of this example embodiment) (P404), and selects F1 (P402) which is in an unevaluated state. During evaluation of F1 (P406), the worker thread attempts to read from F2 (i.e., one of F1's child nodes). F2 is unevaluated, so the worker threads selects F2 (P402), making F2 the new root node, storing F1, and then proceeding to evaluate F2 (P406). F2 reads from F5, and therefore the worker thread then selects F5 (P402) and proceeds to evaluate F5 (P406) which reads from F8. The thread then selects F8 (P402) and evaluates F8 (P406), while putting on hold the evaluation of the preceding nodes F1, F2 and F5, for example.

As shown, F8 does not read from another future, so the worker thread can complete evaluation of F8. The worker thread then removes F8 from the data structure 30, and then restores F5 (i.e., F8's parent node) to be the current root node (P410) and completes evaluation of F5 (P406) using the evaluated value of F8. After F5 is evaluated, the worker thread removes F5 from the data structure 30, restores F2 (i.e., F5's parent node) to the current root node (P410) and completes evaluation of F2 (P406). After F2 is evaluated, the worker thread removes F2 from the data structure 30, restores F1 (i.e., F2's parent node) to the current root node (P410) and completes evaluation of F1 (P406). After F1 is evaluated and removed from the data structure 30, there are no more parent nodes to be restored. The worker thread then traverses the data structure 30 for additional work (P404).

Assume a second worker thread also begins work on the data structure 30 approximately concurrently to the first worker thread. The second thread may attempt to read from F1, which is in the busy state because it has been acquired by the first thread. The second worker thread may traverse the data structure 30 in accordance with the scheduling order (P404) and attempt to read F2, which is also in the busy state and has been acquired by the first thread. The second worker thread continues to traverse the data structure 30 and reads F4 which is unevaluated and can be selected (P404).

In the embodiment shown in FIG. 3, the futures to the left of a node are independent of that node, and therefore for the purpose of this exemplary implementation, the traversal direction is from right to left as a consequence of the scheduling order. Any future node, to which a worker thread successfully acquires exclusive access while traversing the scheduling data structure, is safe to execute on its own stack without risking a deadlock condition. In the event a thread does not find an available unevaluated node during the traversal, the thread can be configured to end operation, or wait a certain amount of time before reinitiating, or any other desired alternative.

In the exemplary embodiment provided above, a thread begins by starting the traverse from the right sentinel node, for example. However, other choices of nodes may be also a valid point from which to start the traversal in accordance with other implementations or embodiments. That is, distributed scheduling can be implemented via any mechanism which arranges for different worker threads to choose different starting nodes for the traversal, in accordance with one or more embodiments.

As an example of a particular policy for distributed scheduling, each worker thread may be associated with a base node. The base node may correspond to the bottom-most future on the call stack of that particular worker thread. Consequently, one or more nodes in the scheduling data structure between the base node of one worker thread and the base node of the next worker thread may correspond to the local scheduling queue for that worker thread, since work produced by that worker thread may be inserted in the respective region of the scheduling data structure.

A round-robin scheduling may be implemented in accordance with one embodiment, wherein a worker thread begins the traversal from the base of the adjacent worker thread in a first order. In this way, one or more worker threads may start from a different node, and may search the nodes produced by the adjacent worker thread before encountering any nodes associated with other threads.

Referring to FIG. 5, a flow diagram of a method for removing a node from a scheduling data structure in accordance with one embodiment is provided. Removing a node from a scheduling data structure (e.g., the data structure illustrated in FIG. 3) may need updating the pointers of one or more neighboring nodes adjacent to the removed node. Access to a node's neighbors may be done through a locked pointer to ensure that an adjacent node does not get removed between the time that the node is accessed and the time it is de-referenced (i.e., removed from the list of nodes to which the removed node refers).

In an exemplary embodiment, there are separate locks on each of the left and right pointers that point to one or more neighbor nodes. The locks can be implemented in various ways, such as a value assigned to a field in each pointer to a node indicate that a node is locked. A thread may acquire the appropriate locks before dereferencing or overwriting the corresponding field. This provides mutual exclusion and a node may not be deleted while some other thread holds the locks on a corresponding pointer pointing to said node.

Accordingly, a thread may have exclusive access to a node that is to be removed (e.g., a current node), and can therefore safely acquire each of the node's locks. Pursuant to the scheduling order illustrated in FIG. 3, the thread may safely acquire the lock of the left neighbor's (i.e., the adjacent neighbor in the direction of traversal) right pointer via the locked left pointer of the current node. In the illustrated example, the thread may also hold the current node's right pointer lock, and therefore it is safe to dereference the right pointer to find the current node's right neighbor (i.e., the adjacent neighbor in the direction opposite traversal). However, acquiring the lock on the left pointer of a node's right neighbor violates the total order of the scheduling algorithm and can lead to deadlock.

Thus, to avoid deadlock, in one exemplary embodiment, the thread is allowed to attempt to acquire the right neighbor's left lock (i.e., the adjacent node opposite the direction of traversal) (P500). If this is successful, the thread holds the locks and proceeds with the removal by acquiring the left neighbor's right lock (i.e., adjacent node in the direction of traversal) (P502). This avoids deadlock and allows the removal process to complete without acquiring any extra locks. In one embodiment, the thread may release the locks it holds upon completion.

In a case where a thread fails to acquire the right neighbor's left lock, this means that some other thread holds the required lock and is waiting on one of the current thread's locks. Since the other thread is waiting for one of the current thread's locks, the current thread wait on the other thread's lock will lead to deadlock. To avoid deadlock, the current thread marks the node as requiring help (P504), thereby passing the responsibility for deleting the node to another thread (e.g., the other thread). The current thread is then complete, and the other thread can continue to make progress, with the additional responsibility of removing the node. The other thread thus holds one or more locks needed to remove the node and the other thread is able to complete the deletion with no further blocking.

In one embodiment, to remove a node marked as requiring help for deletion (P504), a thread that successfully acquires a left lock for a node may satisfy one of the following two options. That is, in accordance with one embodiment, the thread may check to see if it has exclusive access to the node to the left (P506), thereby ensuring that no other thread will attempt to delete it. The current thread may then remove the current node from the scheduling data structure by dereferencing it (P512). In accordance with another embodiment, the thread may repeatedly attempt to acquire one of the locks on the node to its left until it succeeds, while checking to see if delete help is required after every failed attempt (P508).

A successful acquire indicates that any prospective deleting node has been blocked, and will remain blocked until all locks are released. A failed acquire indicates the possibility that there is a thread holding the lock, which may in turn be trying to acquire the lock held by the current thread. In this case, the other thread may mark the node as requiring help for deletion (P504) and pass the responsibility for removing the adjacent node (P510) to the current thread. The current thread then proceeds to remove the current node from the scheduling data structure by dereferencing it (P512).

Referring back to FIG. 3, for the purpose of example, a first worker thread may have completed evaluating F5 and attempt to remove F5 from the data structure while the second worker thread is evaluating F4. In this situation, the first worker thread may not acquire the required locks from F4, and therefore the first worker thread marks F5 as needing help for deletion. The second worker thread completes evaluating F4 and then attempts to remove F4 from the data structure. If the second worker thread can acquire the left pointer locks of F2 and no other thread has access to F5, then the second worker thread can remove F4 from the data structure.

If another thread has accessed F5, then the second worker thread may iteratively check F5 to see if the status of F5 has been changed to indicate F5 requires help for deletion. Once a future has been removed from the scheduling data structure as provided above, the future may safely be de-allocated and deleted from memory.

Depending on implementation, it is possible that the present invention can take the form of an entirely hardware embodiment, an entirely software embodiment or an embodiment containing both hardware and software elements. A software embodiment may include, but not be limited to, to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Other components may be coupled to the system. Input/output or I/O devices (including but not limited to keyboards, displays, pointing devices, etc.) can be coupled to the system either directly or through intervening I/O controllers. Network adapters (e.g., modem, cable modem, Ethernet cards) may also be coupled to the system to enable the data processing system to become coupled to other data processing systems or remote printers or storage devices through intervening private or public networks.

It should be understood that the logic code, programs, modules, processes, methods, and the order in which the respective elements of each method are performed are purely exemplary. Depending on the implementation, they may be performed in any order or in parallel, unless indicated otherwise in the present disclosure. Further, the logic code is not related, or limited to any particular programming language, and may be comprise one or more modules that execute on one or more processors in a distributed, non-distributed, or multiprocessing environment.

The method as described above may be used in the fabrication of integrated circuit chips. The resulting integrated circuit chips can be distributed by the fabricator in raw wafer form (that is, as a single wafer that has multiple unpackaged chips), as a bare die, or in a packaged form. In the latter case, the chip is mounted in a single chip package (such as a plastic carrier, with leads that are affixed to a motherboard or other higher level carrier) or in a multi-chip package (such as a ceramic carrier that has either or both surface interconnections of buried interconnections).

In any case, the chip is then integrated with other chips, discrete circuit elements, and/or other signal processing devices as part of either (a) an intermediate product, such as a motherboard, or (b) and end product. The end product can be any product that includes integrated circuit chips, ranging from toys and other low-end applications to advanced computer products having a display, a keyboard or other input device, and a central processor.

Therefore, it should be understood that the invention can be practiced with modification and alteration within the spirit and scope of the appended claims. The description is not intended to be exhaustive or to limit the invention to the precise form disclosed. These and various other adaptations and combinations of the embodiments disclosed are within the scope of the invention and are further defined by the claims and their full scope of equivalents.

What is claimed is.

1. A method to evaluate objects in a data structure, comprising:
    assigning, with a processor, objects to nodes in a data structure having a root node, wherein a first set of the objects are assigned to the nodes of the data structure in accordance with a first order based on an evaluation path of a first thread to identify dependencies between the objects and to facilitate serial evaluation to avoid deadlock when at least a second thread is concurrently executed to evaluate a second set of the objects during execution of a program; and
    in response to determining that a first object evaluated by the first thread is unavailable, traversing the data structure based on the first order for a second object in the second set of objects to be evaluated by the second thread, the second object being outside the path of the first thread,
        wherein each object in the data structure represents a future created according to a spawning computation which provides an executing thread with a code pointer and an argument from which a result for the future can be computed.

2. The method of claim 1, wherein the future serves as a proxy for a computed value during subsequent execution of the program.

3. The method of claim 2 wherein the computation is performed at a time of spawning.

4. The method of claim 2 wherein the computation is performed when the future is to be used by the first or second thread.

5. The method of claim 2 wherein the computation is performed between a time of spawning and when the future is to be used by the first or second thread.

6. The method of claim 2, wherein each future in the data structure is assigned one of three possible states comprising unevaluated, evaluated or busy.

7. The method of claim 6, wherein the computed value of a future in the unevaluated state returns a pointer and an argument from which a result is computable.

8. The method of claim 6, wherein computing value of a future in the evaluated state returns a value which may be read directly by a concurrently executing thread.

9. The method of claim 6, wherein computing a future in the busy state is dependent on calculation of a second value associated with another future, wherein the second value is not available.

10. The method of claim 1, further comprising removing an object from the data structure after the object is evaluated.

11. The method of claim 10, wherein the object is removed from the data structure in accordance with a locking protocol.

12. The method of claim 10, wherein removing an evaluated object from the data structure comprises:
    acquiring a first lock on an object adjacent to the evaluated object in a first direction opposite to the first order;
    acquiring a second lock on an object adjacent to the evaluated object in the first direction in response to determining that the first lock on the evaluated object is acquired; and
    removing the evaluated object.

13. The method of claim 1, wherein the data structure is a linked list.

14. The method of claim 1, wherein the data structure is a doubly-linked list.

15. A system to evaluate objects in a data structure, comprising:
    a first logic circuit to assign objects to nodes in a data structure having a root node, wherein a first set of the objects are assigned to the nodes of the data structure in accordance with a first order based on an evaluation path of a first thread to identify dependencies between the objects and to facilitate serial evaluation to avoid deadlock when a second thread is concurrently executing to evaluate a second set of the objects; and
    a second logic circuit to traverse, in response to determining that a first object evaluated by the first thread is unavailable, the data structure based on the first order for a second object in the second set of objects to be evaluated by the second thread when the second object is outside the path of a first worker thread,
        wherein each object in the data structure represents a future created according to a spawning computation which provides an executing thread with a code pointer and an argument from which a result for the future can be computed.

16. The system of claim 15, wherein the future serves as a proxy for a computed value during subsequent execution of a program.

17. The system of claim 16 wherein the computation is performed at a time of spawning.

18. The system of claim 16 wherein the computation is performed when the future is to be used by the first or second thread.

19. The system of claim 16 wherein the computation is performed between a time of spawning and when the future is to be used by the first or second thread.

20. The system of claim 16, wherein each future in the data structure is assigned one of three possible states comprising unevaluated, evaluated or busy.

21. A computer readable storage medium having executable instructions that, when executed, cause a machine to at least:
    assign objects to nodes in a data structure having a root node, wherein a first set of the objects are assigned to the nodes of the data structure in accordance with a first order based on an evaluation path of a first thread to identify dependencies between said objects and to facilitate serial evaluation to avoid deadlock when at least a second thread is concurrently executing to evaluate a second set of the objects; and in response to determining that a first object evaluated by the first thread is unavailable, traverse the data structure based on the first order for a second object in the second set of objects to be evaluated by the second thread, the second object being outside the path of the first thread, wherein each object in the data structure represents a future created according to a spawning computation which provides an executing thread with a code pointer and an argument from which a result for the future can be computed.

22. The computer readable storage medium of claim 21, wherein the future serves as a proxy for a computed value during subsequent execution of the thread.

23. The computer readable storage medium of claim 22 wherein the computation is performed at a time of spawning.

24. The computer readable storage medium of claim 22 wherein the computation is performed when the future is to be used by the executing thread.

25. The computer readable storage medium of claim 22 wherein the computation is performed between a time of spawning and when the future is to be used by the executing thread.

* * * * *